United States Patent [19]

Giovannone

[11] Patent Number: 5,379,572
[45] Date of Patent: Jan. 10, 1995

[54] BLISTER PACKAGING SYSTEM AND METHOD

[75] Inventor: Anthony Giovannone, Osterville, Mass.

[73] Assignee: Sencorp Systems, Inc., Hyannis, Mass.

[21] Appl. No.: 111,834

[22] Filed: Aug. 25, 1993

Related U.S. Application Data

[63] Continuation-in-part of Ser. No. 870,405, Apr. 17, 1992.

[51] Int. Cl.⁶ ............................................. B65B 51/32
[52] U.S. Cl. ................................. 53/478; 53/329.3; 53/329.5; 53/373.7; 53/375.3
[58] Field of Search ............... 53/478, 477, 471, 453, 53/375.3, 375.9, 373.7, 373.4, 329.5, 329.3, 329.4, 329.2

[56] References Cited

U.S. PATENT DOCUMENTS

| | | | |
|---|---|---|---|
| 3,481,100 | 12/1969 | Bergstrom | 53/329.5 X |
| 3,523,403 | 8/1970 | Collins | 53/375.3 X |
| 3,874,145 | 4/1975 | Schmidt | 53/329.5 X |
| 5,105,603 | 4/1992 | Natterer | 53/478 X |

FOREIGN PATENT DOCUMENTS 4124343 1/1993 Germany ...................... 53/375.3

Primary Examiner—James F. Coan
Attorney, Agent, or Firm—Richard P. Crowley

[57] ABSTRACT

A blister packaging system and method which includes a preheat station, a cold seal press station, and a trimming station to provide a blister-type cold seal bonded blister package. The method comprises feeding the adjacent sheets of thermoplastic material to a preheat station and preheating selected sections, usually edge areas, of the plastic material for very short periods of time to a tacky or melt temperature, thereafter cold pressing the preheated sections under pressure at a temperature of less than 60° F. to cold bond seal the preheated sections, and thereafter optionally to trim the cold bonded thermoplastic sheet material to a finished size and recovering a blister, cold-bonded package.

21 Claims, 1 Drawing Sheet

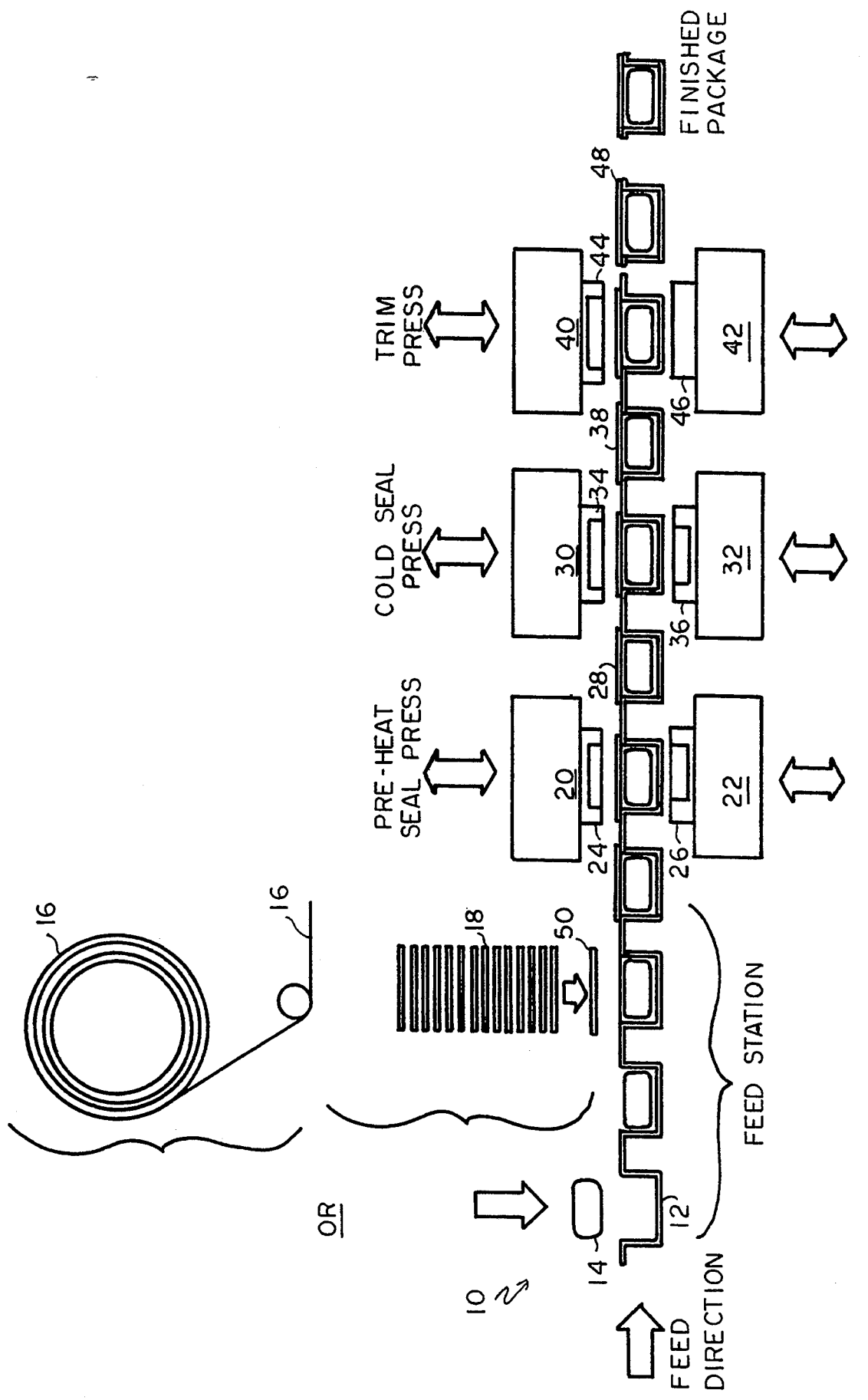

BLISTER PACKAGING SYSTEM AND METHOD

REFERENCE TO PRIOR APPLICATIONS

This application is a continuation-in-part application of U.S. Ser. No. 870,405 filed Apr. 17, 1992, hereby incorporated by reference. The parent application is directed to a blister packaging system and method wherein a plastic formed blister and a cover sheet for the blister, either a separate sheet or card stock or a folded-over portion of the blister package, is discontinuously heat-sealed at tack points, typically uniformly spaced tack points about the contacting edge periphery of the sheets of the package.

BACKGROUND OF THE INVENTION

In plastic film packaging systems, particularly blister-type plastic film packaging systems, the plastic film package generally is heat-sealed by the use of radio frequency (RF) heating techniques. For example, a transparent polyvinyl chloride plastic film may be heat or vacuum-molded and formed into a blister form of sufficient size and form to receive one or more articles to be packaged within the blister package. The outer edges of the blister so formed are usually then heat-sealed, such as by employing a radio frequency, to join and heat seal the surfaces of the blister to the edges of an underlining or adjacent PVC plastic sheet material, which sheet material may be either used alone to form a totally visible package, or may be combined with a cardboard-type sheet material to form a complete blister-type package for the articles.

It is desirable to provide a new and improved blister packaging system, and a method for efficiently, rapidly, and effectively sealing plastic film in such systems, which system and method avoids the difficulties associated with radio frequency heating and sealing, and yet which has significant advantages over prior art heat sealing techniques in the blister film packaging field.

SUMMARY OF THE INVENTION

The invention relates to a blister packaging system and to a method for sealing and bonding plastic film in the blister packaging field. In particular, the invention relates to an improved blister packaging system and to a method which employs a preheat and cold sealing technique which provides multiple advantages over present blister package bonding applications.

The invention is directed to a blister packaging system and to a method of sealing plastic film for blister packaging system, which method comprises feeding two or more thermoplastic sheet materials to be sealed together to form a blister-type packaging with overlapping contacting surfaces to a preheat seal station in the blister packaging system. The method includes heating at the preheat station with heated press platens the surfaces of the thermoplastic sheet materials to be joined to a temperature sufficient to melt or substantially soften the adjacent contacting top and bottom surfaces, for a very short period of time, for example, about one second or less, or for example less than 0.5 second. While heat-pressing the heated surfaces together during the short heating period, either surface to be heated may represent a continuous seal of any desirable width or may represent tack points about all or a portion of the periphery of the two thermoplastic sheets.

The method includes conveying the heat softened and preheat joined sheet material through a cold seal station, and rapidly cooling with chilled press platens at the cold seal station, the heated, joined sheet material to a temperature of generally less than about 60° F. and typically to 40°–50° F. or lower for a sufficient period of time to effect cold bonding, such as a time greater than the heating time, generally greater than 2 seconds, for example up to 5 or more seconds, while pressing the joined sheet material while being rapidly chilled together under pressure, for example, up to about 100 psig, for example, 50–100 psig, to form a strong, cold-sealed bond between the joined surfaces of the sheet material. The method thereafter optionally includes trimming the cold-bonded package at a trim press station to form a trimmed, bonded, finished blister package product, and thereafter recovering the blister-type package so trimmed.

The method and system of the invention is adaptable for the preheating, cold-bonding sealing of a wide variety of sheet-type plastic materials, typically of about up to 35 mils in thickness, for example, ranging from about 2–20 mils, and particularly where one or more sheets represent a blister-formed package. The thermoplastic sheet material typically may comprise a polyethylene and polypropylene or other thermoplastic olefinic polymer or vinyl polymer, such as an ethylene vinyl acetate or polyvinyl halide, and more particularly a transparent polyvinyl chloride sheet material. The packaging system and method of the invention provides for employment of all types of thermoplastic material, which can be preheated and cold-bond welded employing the method. With the welding or cold-bonding of difficult plastic materials that normally or typically require a radio frequency sealing technology for a satisfactory bonding, the method and system permits a much higher cycle rate of production time than in RF welding technology presently in use, while a material that normally requires RF techniques can be sealed without potential exposure to electromagnetic radiation associated with the use of RF equipment. Plastic films which normally warp and wrinkle if heated and then left to cool in the ambient air may be employed in the process and system, since the cold-bond sealing process eliminates warpage and wrinkling associated with straight heat-sealing techniques. In the method and system, the cold bonded sealing area may be made narrower or wider without degradation to bond strength or appearance of the bond seal. The method also permits the sealing of multiple parts at the same time, either continuously or at tack points, and without restriction to the sealed area of the length or width of the particular seal. It has been found that cold bond seal rates of 20 cycles per minute or more have been obtained with the tack points and full perimeter seal type cold bonding with the PVC blister-type packages.

In the method, two or more thermoplastic type sheet materials, such as clear PVC sheet materials, are one or both formed into a blister form package adjacent each other, with the edges to be sealed contacting and adjoining each other, wherein the sheet materials have contained within the blister-type package articles to be packaged, such as, for example, dry cell batteries as merely an illustrative example. The multiple formed sheets making up a plastic sheet material to be joined to the blister system may be manually or automatically fed, for example, on the conveyor feed mechanism or other means from a feed station to a preheat station in the blister system. The preheat station is typically comprised of an upper press platen with an upper heated tool on the upper surface thereof, and a lower press platen with a lower heated tool on the opposing surface to the upper heated tool, so that by movement of the platens together heat is applied to the selected areas of the top and bottom of the sheet for a predetermined length of time, with heat being applied only to the surfaces that are to be sealed or joined. Pressure is applied only momentarily during preheating, and typically for less than a half a second, for example, 0.1–0.5 second, with the use of PVC, for example, the platens opposed may be at a temperature, for example, of 300°–350° F. with very light pressure applied, particularly less than 100 psi, such as 60–80 psi, sufficient only to heat the selected PVC area to a state, throughout substantially the depth of the plastic material, so that the plastic material, for example, of the preheat station, can be pulled apart at the station or between the preheat and cold press stations.

The system and method includes transferring the preheated sheet materials into a cold seal press station comprising an upper platen with an upper cooling tool and a lower platen with a lower cooling tool, the platens adapted to move between an open and closed position, as the platens at the preheat seal press station. However, typically, the platens would be cooled, such as by chilled water, sufficient so that the upper and lower cooling tools would be at a temperature of 60° F. or at a generally lower 50° F. or lower and employ a sealing pressure of less than 100 psi, such as 50–80 psi, with the two top and bottom cooling tools under pressure brought into direct contact with the preheated PVC plastic surfaces area at the state, for a predetermined length of time, generally greater than the length of time of the preheating, such as more than one second, and generally from one to 5 seconds, so as to affect the rapid chilling and cold-bonding under pressure of the plastic sheet materials to affect permanent sealing or cold-joining together. The cold sealing of the plastic sheet material provides a very high quality permanent bond. The system and method thus provides for a preheating and cold-bonding which provides a very short time cycle, permits a high quality cold seal bonding and rapid production rates with the preheat and cold-bonding generally taking place in less than two seconds or less, and often even in one second.

Optionally, the cold-bonded plastic sheet material blister formed may then be sent to a trim press, also comprising an upper platen with an upper trim tool and a lower platen with a lower trim tool adapted to move between open and closed trimming positions, whereas to trim off extraneous material from the cold bonded sheet materials and to produce a finished package.

The packaging system of the invention thus includes a feed station for the assembly of two or more thermoplastic sheet materials to be sealed together in a blister type or other packaging arrangement, with the articles within the blister-type package and the sheet material in an overlapping contacting top and bottom surfaces, a preheat station for the preheating of the desired sections of the plastic sheet material, a cold seal station for the cold joining of the preheated sections of the plastic sheet material, and optionally a trimming station to provide for trimming of the bonded, joined plastic sheet material and a station for the recovery of the finished package material.

While the system and method of the invention is described in particular in the illustration regarding a blister packaging system, it is recognized that the system and method may be applicable in use with a wide variety of thermoplastic and plastic sheet materials, with any sort of a packaging or other plastic joining system. The invention will be described for purposes of illustration only in connection with certain particular illustrative embodiments. However, it is recognized that various modifications, changes, additions and improvements to the illustrated embodiments may be made by those persons skilled in the art without departing from the spirit and scope of the invention.

BRIEF DESCRIPTION OF THE DRAWING

The drawing is a schematic illustration of the blister packaging system and method.

DESCRIPTION OF THE EMBODIMENT

The drawing shows a blister packaging system and method 10 employing a transparent PVC 4–6 mil vacuumed heat-formed blister 12 as a first thermoplastic material attached together and moving in the feed direction shown, for example, by a conveyor belt or other indexing moveable means. The blister 12 is designed in size and shape to receive an article 14 to be packaged at a feed station, such as, for example, a pair of dry cell batteries to be inserted at the feed station into each open blister 12. A second thermoplastic sheet material, such as a blister card feeder 18, is used at this feed station to feed individual blister cards 50 of either plastic, e.g., PVC or card stock, e.g., cardboard with a PVC surface, over the open top of the article-filled blister 12. Optionally, the second thermoplastic sheet material at the feed station may be delivered in continuous or cut form from a feed roll 16 or provided feed stacks 18.

The system and method 10 includes a preheat seal press station having a preheated press comprising an upper 20 and lower 22 platens with upper 24 and lower 26 working tools and adapted to move between an open (as shown) and closed position. The working tools 24 and 26 are heated to a temperature, for example 330° F., sufficient to heat the adjacent contacting peripheral edges of the blister 12 and sheet material 16 or 18 briefly to the plastic temperature under light pressure, such as less than 100 psi, e.g. 40–60 psi, for a brief time period, typically less than one second, for example, 0.1–0.5 seconds to preheat and join the contacting surfaces together at the selected tack points or as a continuous preheat seal in the closed, preheated position of platens 20 and 22 to form package 28. The package 28 is not sealed but has a tacky heated area joining the surfaces, and the blister 12 and the cover material 16 or 18 can be easily pulled apart. In the preheat cycle, the plastic is heated substantially through the depth of the plastic film thickness, so that on cold bonding at the cold seal station the plastic material forms a deep, strong, cold-seal bond.

The system and method 10 includes a cold seal station for the pressure, cold-sealing and bonding together of the peripheral preheated surface and areas of the blister 12 and material 16 or 18 in the package 28 directly received from the preheat station. The cold-seal press comprises an upper 30 and lower 32 platen with upper 34 and lower 36 to form a cover to be sealed about the outer extended edges of the blister 12 either at tack points or continuously, for sealing with the cold seal press adapted to move between an open position (as shown) and a closed cold pressure position. The working tools 34 and 36 are chilled, such as by cooling water, to a temperature of below 60° F., typically 40°–50° F. to chill rapidly, such as in less than about 5 seconds, for example, 1–2 seconds, the preheat area or edge portions of package 28 under pressure of generally less than 100 psi, for example, 50–80 psi, to affect a cold sealing and cold bonding of the preheat tack points or continuous edge seal of package 28. The cold press seal provides a sealed package 38 with a strong cold-seal bond with the preheating and cold-sealing occurring in a very short cycle time, less than 5 seconds.

The system and method 10 optionally, as shown, includes a trim station for the trimming to final size and shape of the package 38. The trim station may be incorporated in or with the cold seal press station, so that cold bonding and trimming occurs in a single operation to save time. The trim station, as shown, comprises an upper 40 and lower 42 platen with an upper 44 and lower 46 trim tools, the platen and tools adapted to move between an open position (as shown) and a cold trimming position in a very short time cycle to provide a cold-bonded, trimmed package 48 as a finished package.

While the system and method has been illustrated using either a roll feed stock or a blister card board feed stock, it is recognized that the system and method may be usefully employed where the thermoplastic feed stack is folded over so that one or more blister formed in one portion of the feed stack to receive an article to be packaged or two blisters to be formed and sealed together to form an article receiving space, and may have a cover sheet to seal a blister folded over from a portion of the plastic feed stack.

The system and method provides for rapid, efficient, and good bond strength formation of a blister package.

What is claimed is:

1. A method of sealing a blister package, which method comprises:
    a) feeding from a feed station to a preheat seal station two thermoplastic sheet materials to be sealed together to form an article-containing blister package with overlapping, contacting top and bottom surfaces;
    b) preheating at the preheat seal station with heated press platens the top and bottom surfaces of the thermoplastic sheet materials to be joined to a temperature sufficient to melt to a tacky state the top and bottom surfaces while pressing the heated surfaces together during the preheating period to form a preheated blister package;
    c) transferring the preheated blister package to a cold seal station;
    d) rapidly cooling with chilled press platens at the cold seal station the preheated sheet material package to a temperature of less than about 60° F. for a period of time while pressing the joined preheated sheet materials of the blister package together under pressure to form a strong cold-seal bond between the joined surfaces; and
    e) optionally trimming at a trim press station the cold-bonded, joined, plastic sheet material of the blister package to form a trimmed, bonded blister package product.

2. The method of claim 1 which includes rapidly cooling and trimming in a single operation.

3. The method of claim 1 which includes a first flat sheet of thermoplastic material having a surface of outward sides and a second sheet of thermoplastic material having a blister formed therein to receive an article and outward sides, the surface of the said sides in contact with the outward sides of the first sheet material.

4. The method of claim 3 which includes inserting an article to be packaged within the blister at the feed station prior to the preheat seal station.

5. The method of claim 1 which includes a preheat seal station having opposing movable upper and lower platens, each with a heated tool on the inner surfaces thereof for heating and pressing to form the preheated blister package.

6. The method of claim 1 which includes a cold seal station having opposing movable upper and lower platens, each with a cooling tool on the inner surface for cooling and pressing, to form the cold-bonded blister package.

7. The method of claim 1 which includes preheating the sheet materials to a temperature of greater than about 300° F. at a pressure of less than about 100 psig.

8. The method of claim 1 which includes cooling the preheated sheet materials to a temperature of 60° F. or less for a period of time of less than about 5 seconds at a pressure of less than about 100 psig.

9. The method of claim 1 wherein the thermoplastic sheet material comprises a polyvinyl chloride sheet material having a thickness of less than about 35 mils.

10. The method of claim 1 which includes adding trimming means to the cold seal station to trim the bonded, joined sheet material to a selected blister package size.

11. The method of claim 1 which includes preheating the sheet materials for a time period of less than about 1 second.

12. The method of claim 1 wherein one of the sheet materials comprises a thermoplastic, coated cardboard or plastic sheet feed stock material as a cover sheet for a blister formed in the thermoplastic material.

13. The method of claim 1 which includes preheating and rapidly chilling at selected tack points about the peripheral edges of the thermoplastic sheet material.

14. The blister package product produced by the method of claim 1.

15. A blister packaging system which comprises:
    a) a feed station means to form a blister package containing an article, the blister package composed of a thermoplastic blister material and a thermoplastic sheet material with adjacent contacting surface portions;
    b) a preheat press station means comprising upper and lower platens with upper and lower working tools to preheat selected contacting areas of the thermoplastic sheet materials to a tacky, molten state;
    c) a cold seal press station means comprising upper and lower platens with upper and lower sealing tools to chill rapidly to a temperature of less than about 60° F. the preheated areas of the thermoplastic materials under pressure to cold seal and bond the selected areas together; and
    e) a trim station means to trim the cold-sealed, bonded blister package to a finished blister package product.

16. The system of claim 15 wherein the feed station means includes a thermoplastic blister feeding section and a card or plastic sheet stock feeding section to feed a card stock or plastic sheet over the blister and an article feeding section to feed an article to be packaged into the blister.

17. The system of claim 15 wherein the feed station means includes a thermoplastic blister feeding section with a continuous roll sheet material section to feed a thermoplastic or card stock material over the blister and an article feeding section to feed an article to be packaged into the blister.

18. The system of claim 15 wherein the trim station means includes upper and lower platens with upper and lower trimming tools.

19. The system of claim 15 wherein the preheat station means preheats the thermoplastic materials to a temperature greater than about 300° F. for less than about one second at a pressure of less than about 100 psig.

20. The system of claim 15 wherein the cold seal station means chills rapidly the preheated thermoplastic sheet materials to a temperature of less than about 60° F. For a time period of less that about 5 seconds at a pressure of less than about 100 psig.

21. The system of claim 15 wherein the thermoplastic sheet material comprises polyvinyl chloride.

* * * * *